F. SCHERR & F. DARKIN.
MACHINE FOR PREPARING VEGETABLE FIBERS.
APPLICATION FILED OCT. 26, 1905.
899,846.
Patented Sept. 29, 1908.
2 SHEETS—SHEET 1.
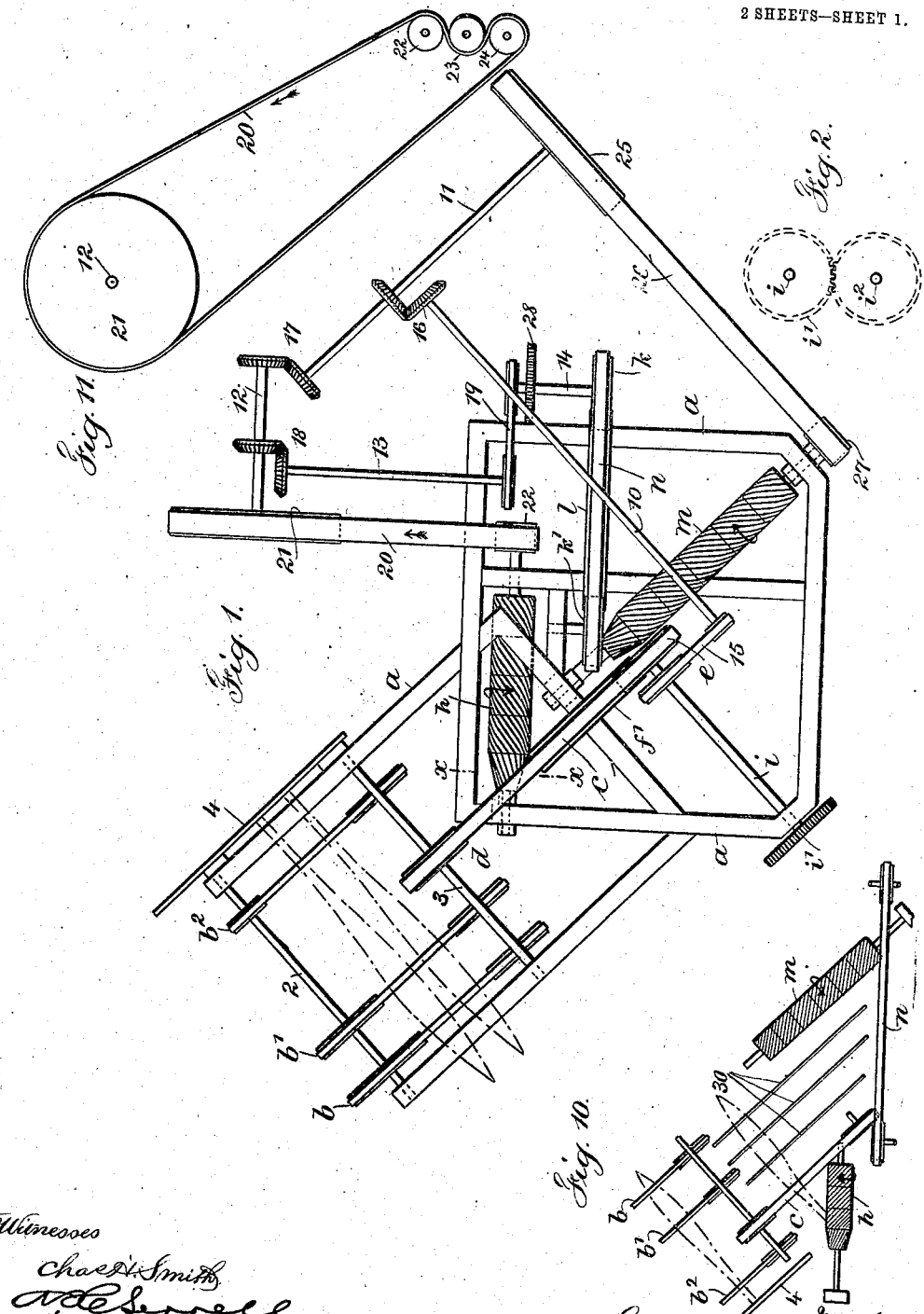
Witnesses
Chas H Smith
AdeSerrell
Inventor
Frederick Scherr.
Frank Darkin.
Harold Serrell atty

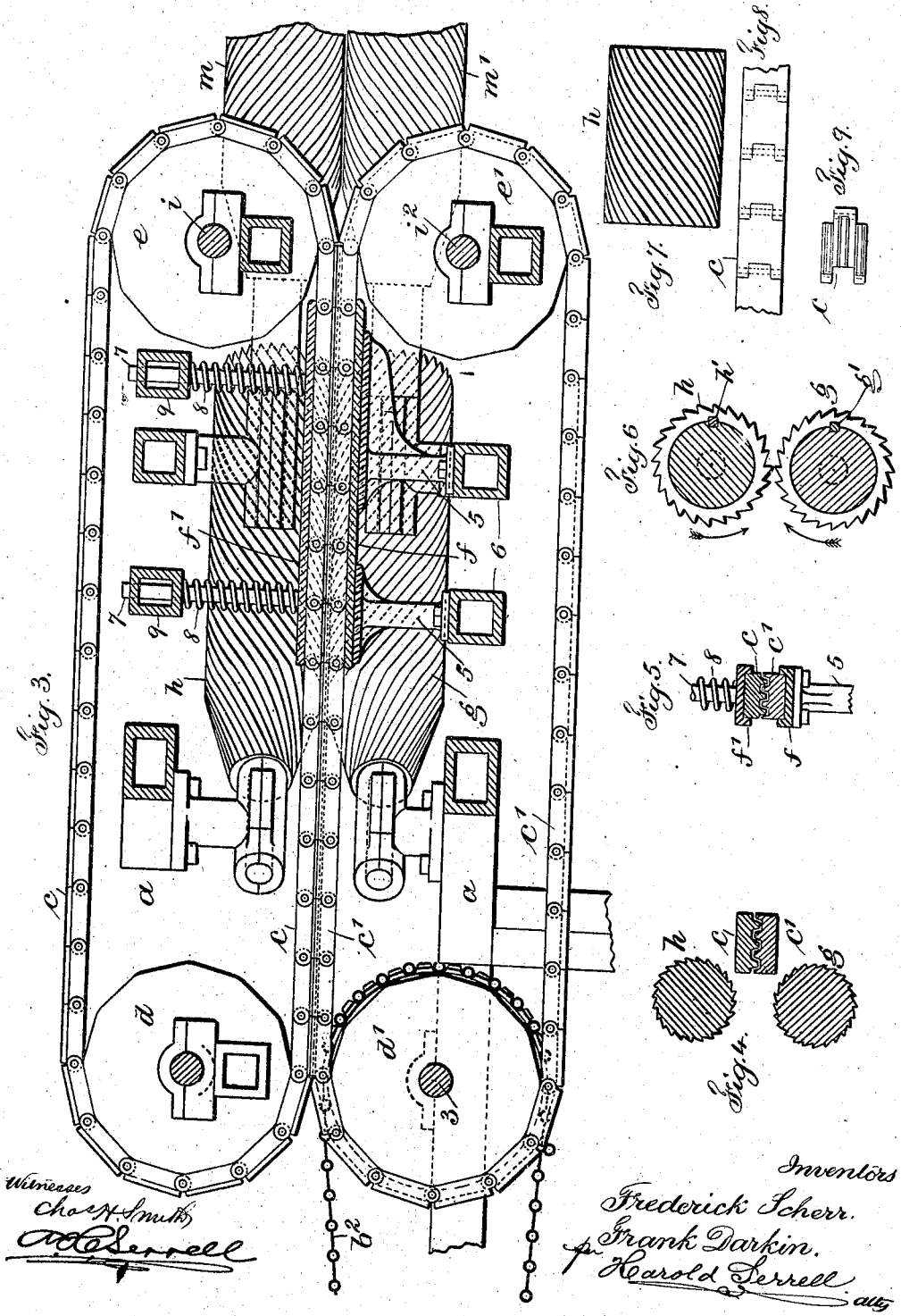

UNITED STATES PATENT OFFICE.

FREDERICK SCHERR, OF ROOSEVELT, NEW YORK, AND FRANK DARKIN, OF PASSAIC, NEW JERSEY.

MACHINE FOR PREPARING VEGETABLE FIBERS.

No. 899,846.　　　　Specification of Letters Patent.　　　Patented Sept. 29, 1908.

Application filed October 26, 1905. Serial No. 284,440.

*To all whom it may concern:*

Be it known that we, FREDERICK SCHERR, residing at Roosevelt, in the county of Nassau and State of New York, and FRANK DARKIN, residing at Passaic, in the county of Passaic and State of New Jersey, both citizens of the United States, have invented an Improvement in Machines for Preparing Vegetable Fibers, of which the following is a specification.

Our invention relates to improvements in machinery for scraping off the pulpy vegetable matter from the fiber in the leaves of agaves and other similar plants, for the separation of the fiber and preparing same for the market. In the operation of the machines heretofore employed for this purpose, the leaves were scraped on one side only by beater wheels operating in a continuous sweep against an inclined curved surface, and this was a great strain, not only upon the mechanism, but especially upon the fibers, with the result that many fibers were broken and there was consequently much waste, and the object of our invention is to provide a machine in which the action is local and simultaneous on both sides of the leaf and wherein the forward movement of a gripping mechanism shall progress the scraping operation and the action be gradual so as to prevent cutting the fibers.

In the device of our improvement, the leaves are placed upon conveyers from which they are successively engaged by grip feed chains at any preferred point between one end and the longitudinal center and, as they are drawn forward, they pass between scraping cylinders set at an angle to the line of travel of said grip feed chains. These cylinders have series of scraping edges or blades, either straight or spirally arranged, that remove the pulp and spread out and clean the fibers from the point held in the grip feed chains toward and to one end of the leaves, and said cylinders have preferably tapering forward ends to gradually start the scraping operation and avoid sudden and abrupt action on the leaves. From this set of devices and preferably before their release from same, the fibers as cleaned are engaged by a second set of grip feed chains which may or may not be set at an angle to the first set, and the unscraped ends of the leaves as they come away from the first set of grip feed chains are engaged by a second set of scraping cylinders like the first set and placed at an angle to the line of movement of the second pair of grip feed chains and by this second set of devices the scraping operation is completed, the pulp is entirely removed and the fibers are delivered clean from the second set of grip feed chains.

In the drawing, Figure 1 is a diagrammatic plan representing the devices of our improvement. Fig. 2 is a diagrammatic elevation of one of a pair of the connecting gears. Fig. 3 is a vertical section and elevation representing one pair of the grip feed chains and one pair of the scraping cylinders. Fig. 4 is a cross section at the dotted lines $x, x$, of Fig. 1 showing the relation of the grip feed chains to the entering bite of the scraping cylinders. Fig. 5 is a cross section through the grip feed chains at their yielding supports. Fig. 6 is a cross section through the scraping cylinders, and Fig. 7 is an elevation of one of the separable tubular sections of the scraping cylinders. Fig. 8 is an inverted plan of part of the grip feed chains. Fig. 9 is a plan of one of the links of the grip feed chains to show its corrugated or toothed surfaces. Fig. 10 is a diagrammatic plan view of a modification of our invention, and Fig. 11 is a diagrammatic side elevation showing the method of operating the scraping cylinders. Figs. 3–9 inclusive are on a larger scale for clearness.

There are certain essential features of our present invention, and our purpose is to fully and accurately describe the same; therefore, the frame $a$, shown in the diagrammatic plan view Fig. 1 is simply illustrative of any suitable frame that may be employed to support the essential feature. Referring to Fig. 1, $b$, $b'$ and $b^2$ represent belts or chains passing around suitable pulleys or sprocket wheels on the shafts 2, 3 and forming a conveyer upon which the leaves to be scraped are placed. It is to be understood that these leaves are thick and heavy, therefore, in themselves rigid, and will lie substantially flat when supported at only a few points, for which reason the belts shown are sufficient.

The position of the leaves upon the belts forming the conveyer, are determined by a gage board 4 against which similar ends of the leaves are placed, said gage board however, is not indispensable and may be omitted. $c$, $c'$ are endless grip feed chains having closely adjacent and meshing ribbed surfaces by means of which the leaves are gripped as they advance upon the belts forming the conveyer. These chains are mounted upon sprocket wheels or polygonal rollers d d' and suitable shafts therefor in bearings arranged upon the frame of the machine. Corresponding polygonal rollers e e' also mounted upon suitable shafts in bearings in the frame are at the other ends of the grip feed chains c, c'. Figs. 4, 5, 8 and 9 show particularly in detail the construction of the links of the endless grip feed chains. As will be noticed particularly from Fig. 3, the shaft 3 which supports the pulleys of the belts b, b' b² is also the shaft of the polygonal roller d', consequently the leaves carried on the belts forming the conveyer move directly into the bite of the chains.

The polygonal roller e of the chain c is on a shaft i in suitable bearings in the frame with a gear i' at the end of the shaft. This meshes with a corresponding gear on a second shaft i² which is the shaft of the polygonal roller e' of the chain c', rotary motion being thus communicated to not only the polygonal rollers and the endless grip feed chains c, c', but from the shaft 3 and the pulleys and belts thereon to the shaft 2 and its pulleys.

We provide a fixed guide f and a yielding guide f' above the same. These guides receive the adjacent portions of the endless grip feed chains and the guides are placed at the position where it is most necessary to grip the leaves firmly, as the pulp is being removed therefrom and the fibers cleaned. We have shown as supports for the fixed guide f, the columns 5 mounted upon the bars 6. The yielding guide f' is provided with pins 7 placed vertical and which pass through bars 9, there being helical springs 8 between the upper surface of the yielding guide and the under surfaces of the bars, the springs exerting a downward pressure upon the guide f' to press the grip feed chain c towards the grip feed chain c' so as to hold in the bite between the chains the leaves to be scraped.

g h represents the first pair of scraping cylinders which are provided with conical forward ends, the meeting or adjacent faces of which are in a common horizontal plane with the meeting or adjacent faces of the grip feed chains c c'. These scraping cylinders are provided with edges or blades either straight or spirally arranged, which edges continue down the conical forward ends. These cylinders are preferably formed of shafts with sleeves or tubular sections mounted thereon, said tubular sections having scraping edges on their surfaces and being keyed in position, it being advantageous to be able to remove any tubular section that may become injured and replace it with a new one. Fig. 1 shows the division lines of the cylinders into the tubular sections. These cylinders are placed at an angle to the line of the endless grip feed chains c, c', as will appear from Fig. 1.

Fig. 6 taken through the scraping cylinders shows that their scraping edges do not quite meet; they are turned in unison but in opposite directions by the devices shown in Fig. 11, which consist of a belt 20 over a power pulley 21 and running in opposite directions over the pulleys 23, 24 on the shafts of said cylinders and also over an idle pulley 22. As the leaves to be treated are drawn along by the endless grip feed chains c, c' they are drawn in between the conical ends of the scraping cylinders g, h, which commence to act upon the opposite sides of the leaves gradually removing the pulp and compressing the fibers, the leaves being gradually drawn nearer to the full diameter of the scraping cylinders and between the same.

In the scraping operation the pulp is pushed forward; the fibers are compacted to a common central plane between the scraping cylinders and the parts to be scraped advanced with the advance movement of the grip chains, so that by the time the parts to be scraped reach the ends of the scraping cylinders, the pulp will have been entirely removed from substantially one half of the longest leaves, and it will then become necessary to scrape the other half of the leaves previously held by and between the endless grip chains.

For the purpose of communicating motion between the various parts we have shown in Fig. 1, the shafts 10, 11, 12, 13, 14. On one end of the shaft 10 there is a pulley and another pulley on the shaft i with a belt 15 connecting the two and the other end of the shaft 10 is provided with a bevel gear 16 meshing with a similar bevel wheel on the shaft 11. The shafts 11 and 12 are connected by bevel gears 17; the shafts 12 and 13 by bevel gears 18; the shafts 13 and 14 by a belt 19 and pulleys around which the same passes. The shaft 12 is the shaft of the pulley 21 and the shaft 11 is the shaft of a pulley 25 around which passes a belt 26, and said belt is advantageously arranged to pass around a series of pulleys similar to the series 21 to 24 and of which the pulley 27 is one employed to actuate a pair of scraping cylinders m m' similar to the scraping cylinders q, h.

We have shown in elevation, Fig. 3, parts of the scraping cylinders m m', and, in the plan, Fig. 1, the upper scraping cylinder m and the upper grip feed chain n of the corresponding pairs of said scraping cylinders and grip feed chains. The grip feed chains n and the scraping cylinders m m' are also placed at an angle to one another, and as shown here also at angles to the chains c, c' and cylinders g, h, of which they are the duplicate, for the purpose of scraping the remaining unscraped portion of said leaves. From Fig. 1 it will be noticed that the grip feed chains $n$ are not only at an angle to the grip feed chains $c$, $c'$, but that their ends overlap, consequently the scraped fibers, from the operation of the scraping cylinders $g$, $h$, pass into the bite of the grip feed chains $n$ substantially simultaneously with the loosening of the pulpy portion of the leaves from the grip feed chains $c$, $c'$; therefore, said pulpy portion is at once drawn into the adjacent conical ends of the scraping cylinders $m$, $m'$ in which the operation of scraping the second half of the leaf, is similar to the operation hereinbefore described of scraping the first half of the leaf, the divergence of relation of the grip feed chains to the scraping cylinders providing for drawing through the cylinders the fibers as scraped from the respective parts of the leaf until the leaf is entirely scraped. The grip feed chains $n$, are mounted upon polygonal rollers $k$ $k'$, supported by suitable shafts in the frame of the machine, and they are provided with guides $l$, in all essentials the same as the guides $f$, $f'$, although in the diagrammatic view Fig. 1, the details are not shown. The shaft 14 is the shaft of one of the polygonal rollers $k$ and it is our intention that the superimposed polygonal rollers be connected by gears 28 upon corresponding shafts, for communicating movement, which gears are similar to the gears $i'$ shown in Fig. 2. Fig. 7 shows one of the tubular sections of which the scraping cylinders $g$, $h$, and $m$, $m'$ are preferably composed or built up, and Fig. 6 is an end elevation of the corresponding sections of said scraping cylinders and cross-sections of the shafts on which they are mounted, and of the splines or keys $h'$ and $g'$ by means of which it is proposed to fasten the cylinders to the shafts, so as to prevent them turning on the same and to enable the relative positions of corresponding scraping edges to be maintained.

In the modified form of our invention shown in Fig. 10, similar letters of reference are employed to indicate similar parts to those shown in Fig. 1. In this form of our invention, the leaves as brought to the grip feed chains on the belts $b$, $b'$ $b^2$, are engaged by the grip feed chains $c$, $c'$, and are scraped by the scraping cylinders $g$, $h$, the scraping operation, however, in this form of the invention starting at the ends of the leaves and stopping near the gripped portion, and after the first half of each leaf is thus scraped, the fibers are engaged by the second set of endless grip feed chains $n$ and are scraped by the second set of scraping cylinders $m$ $m'$ from the other end of the leaf to the point at which the previous scraping stopped, the co-acting parts in this modification being also set at angles to one another, but the operation being directly the opposite from that performed by the devices in the first described form of the invention shown in Fig. 1. In this modified form of our invention we prefer to employ the rods 30 shown in Fig. 10, for supporting the uncleaned portion of the leaves as they are moved to the second pair of scraping cylinders.

The leaves of the agaves which are treated for the removal of the pulp by the machine of our improvement, are not only heavy, thick and strong, but the skin of the leaves is usually thicker on one side than on the other, and in the devices heretofore employed in this art and in which the leaves were scraped on one side only, the removal of the leaf skin and especially the thicker one was largely chargeable for the loss of and damage to the fiber.

In the device of our improvement simultaneous action on opposite sides of the leaves crushes the skin and pulp preparatory to its removal, and the skin is removed from both sides before the pulp is actually reached, consequently the compacting of the fibers comes at the same time as the removal of the pulp and the cleaning of the fibers leaves them substantially uninjured and unbroken.

We claim as our invention:—

1. In a machine for preparing vegetable fibers and in combination, co-acting devices set at an angle to one another, the one for engaging the leaves at a suitable point and the other for removing the pulp thereof from a part of each leaf and a second like series of co-acting devices also set at an angle to one another, the one for engaging the fibers and the other for removing the pulp from the balance of the leaves, the respective series of devices being set at a suitable angle to one another.

2. In a machine for preparing vegetable fibers, the combination with a conveyer device, of co-acting devices set at an angle to one another the one for engaging the leaves at a suitable point and the other for removing the pulp thereof from a part of each of said leaves, and a second like series of co-acting devices also set at an angle to one another and to the first set of devices for engaging the fibers and removing the pulp from the balance of the leaves.

3. In a machine for preparing vegetable fibers, the combination with a series of belts and pulleys forming a conveyer device, of a pair of endless grip feed chains in line with the same and receiving and holding the leaves to be scraped, a pair of scraping cylinders having conical forward ends and set at an angle to the line of travel of the endless grip feed chains and adapted to receive and scrape said leaves from the point held in the grip feed chains to one end, and a series of similar co-acting devices for engaging the fibers and scraping the other half of the leaves.

4. In a machine for preparing vegetable fibers, the combination with a series of belts and pulleys forming a conveyer device, of a pair of endless grip feed chains in line with the same and receiving and holding the leaves to be scraped, a fixed guide in which the lower of the endless grip feed chains moves during the scraping operation, and a yielding guide above the fixed guide and co-acting therewith, a pair of scraping cylinders having conical forward ends and set at an angle to the line of travel of the endless grip feed chains and adapted to receive and scrape said leaves from the point held in the grip chains to one end, and series of similar co-acting devices for engaging the fibers and scraping the other half of the leaves.

5. In a machine for preparing vegetable fibers, the combination with a series of belts and pulleys forming a conveyer device, of a pair of endless grip feed chains in line with the same and receiving and holding the leaves to be scraped, a pair of scraping cylinders having conical forward ends and set at an angle to the line of travel of the endless grip feed chains and adapted to receive and scrape said leaves from the point held in the grip feed chains to one end, a second pair of endless grip feed chains and a second pair of scraping cylinders agreeing in all essential details with the first pair of endless grip feed chains and the first pair of scraping cylinders, the respective pairs of grip feed chains and scraping cylinders being set at suitable angles to one another so as to first scrape one half of the leaf and then engage the fibers and scrape the second half.

6. In a machine for preparing vegetable fibers, the combination with a conveyer device, of co-acting devices set at an angle to one another, the one for engaging the leaves at a suitable point and the other for removing the pulp simultaneously from opposite sides of the leaves and from a part of the length thereof, and a second like series of co-acting devices also set at an angle to one another for engaging the fibers and simultaneously removing the pulp from the opposite sides of the balance of the leaves.

Signed by us this 29th day of September 1905.

FRED. SCHERR.
F. DARKIN.

Witnesses:
GEO. T. PINCKNEY,
BERTHA M. ALLEN.